Oct. 28, 1969

J. H. DANUSER 3,474,872

COMPACT BORING MACHINE

Filed Feb. 8, 1967

INVENTOR

JOHN HENRY DANUSER

BY *Cohn and Powell*

ATTORNEYS

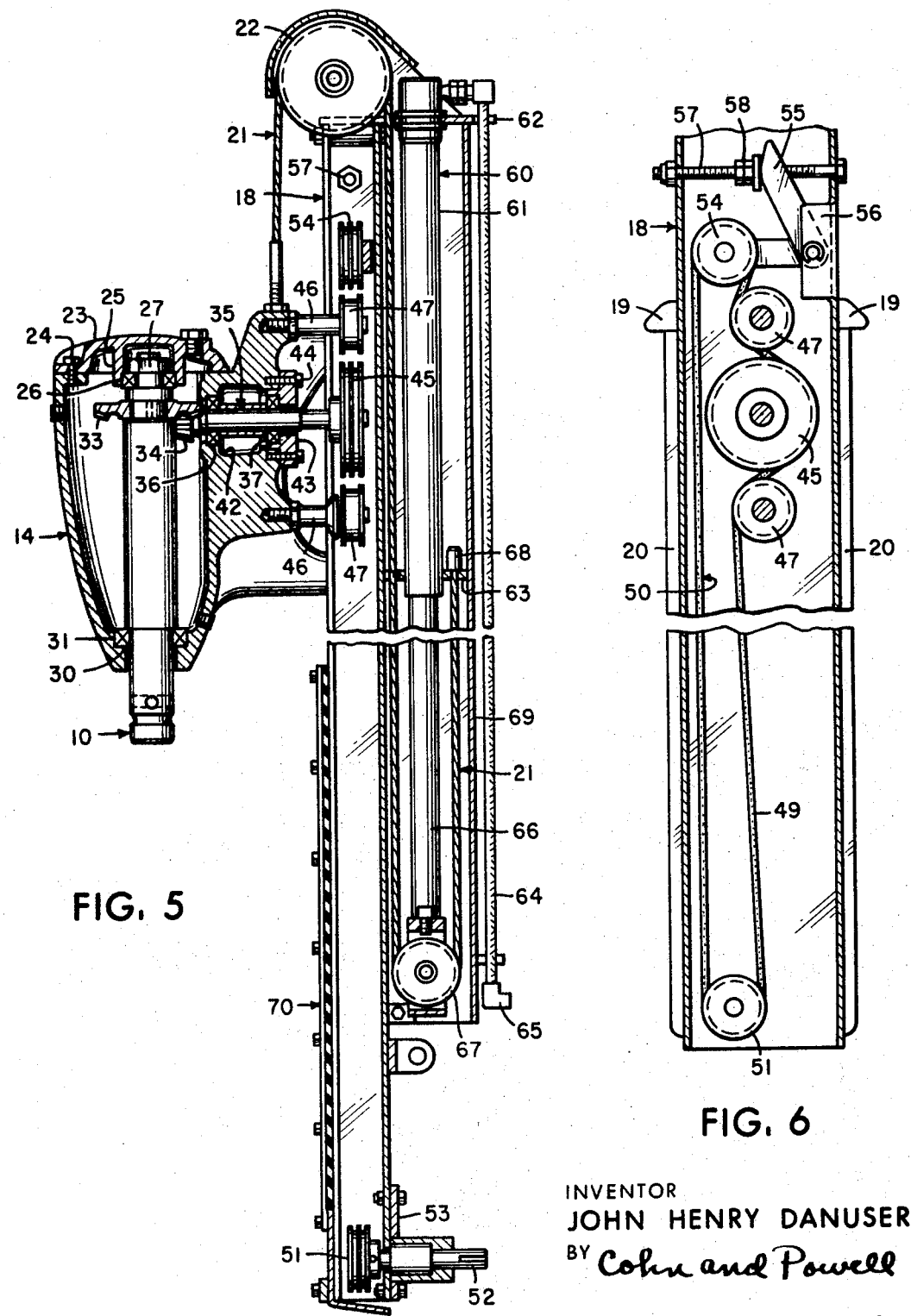

3,474,872
COMPACT BORING MACHINE
John Henry Danuser, % Danuser Machine Company,
500 E. 3rd St., Fulton, Mo. 65251
Filed Feb. 8, 1967, Ser. No. 614,630
Int. Cl. E21c *11/00, 5/06;* B23q *5/24*
U.S. Cl. 173—140                                   4 Claims

ABSTRACT OF THE DISCLOSURE

An earth-boring machine having a boring tool attached to a vertically aligned main shaft. The main shaft is mounted within a crosshead housing which is provided with rollers and mounted upon a vertical post having roller tracks along its length. The post serves as a housing for an endless belt system which transmits motive forces from an external power supply to the main shaft by means of a transverse drive shaft. The drive shaft has a pulley at one end, which maintains tensioned driving contact with one flank of the belt, and a bevel gear at the other end connecting with and driving the main shaft. A hydraulic plunger, attached by cable to the main shaft housing, provides a retraction system which enables the boring tool to be raised and lowered while the boring action continues.

BACKGROUND OF THE INVENTION

This invention relates generally to improvements in a compact boring machine, and more particularly to a tractor-mounted, earth boring auger for use in digging vertical holes.

In order to provide an effective boring device of the type under consideration, it is necessary to maintain the operable rotation of the boring tool while its downward motion progresses. Earth boring devices, which have been used up until now to accomplish these coexistent actions, may be broadly categorized into two types. One of these types, and probably the more common, is that which includes a crosshead mounted motor. In this situation, of course, the power supply is built directly into the operably rotating parts to provide a power tool unit which is raised or lowered as required. The economy and convenience which result from utilizing the power supply of the vehicle transporting the boring equipment is lost with this type of tool. The present invention, on the other hand, permits the use of an external power supply.

Another common type of boring machine is that which incorporates a vertical worm and pinion drive. While this method permits the use of an external power supply, the operational rotation of the boring tool and its elevational control are, in general, a function of the rotation of the worm. Some form of disengaging mechanism or clutch release mechanism is necessary, as a rule, to raise and lower the boring tool rapidly. No such disengaging or clutch release mechanism is required to operate the present invention effectively. On the contrary, the flexible, endless belt drive permits the boring tool to be raised and lowered rapidly or slowly as required, or even to be maintained at a stationary elevation, during the transmission of motive force from the external power supply to the boring tool. This is possible because the elevational control, provided by the hydraulic retraction system is independent of the drive system.

SUMMARY OF THE INVENTION

The machine includes a vertically aligned boring tool attached to the end of a main shaft. The main shaft is provided with a crosshead housing which serves to movably mount the main shaft on a vertical post. A drive means is provided which includes an endless flexible belt system mounted within a channel-shaped post, the post interior serving as a housing.

The endless belt driver pulley includes an adaptor, having a fixed elevation relative to the post, connected to a power supply.

The endless belt transmits motive force to a transverse drive shaft, which is provided with a contact pulley at one end to accomplish this purpose. The other end of the transverse drive shaft is operably interconnected to the main shaft.

Belt-tensioning pulleys are mounted on stub shafts, constituting trunnions, projecting laterally on the crosshead housing. The tensioning pulleys, which are adjacently located above and below the transverse shaft contact pulley serve to maintain the contact between the endless belt and the transverse drive shaft contact pulley as the crosshead housing traverses the post.

A longitudinal hydraulic cylinder including a plunger provides a retraction means for adjusting the height of the boring tool. The cylinder is invertedly attached to the post. A cable connection is provided between the cylinder and the crosshead housing, and cable sheaves are provided at the free end of the plunger and at the head of the post to insure that outward movement of the plunger raises the crosshead housing, and thereby provides elevational control means. Inward movement of the plunger permits the crosshead housing and boring tool to move downward under gravity.

The lower part of the post includes a self-sealing slit receiving the transverse drive shaft, yet protecting the interior of the post housing from waste discharged by the adjacent boring tool.

The features referred to in this summary, together with numerous other advantages of the invention, will more clearly appear from the following detailed description of a preferred embodiment, particularly when considered in connection with the accompanying drawing.

BRIEF DESCRIPTION OF THE DRAWING

FIG. 5 is an enlarged sectional side elevation illustrating the drive mechanism and the elevating mechanism, and FIG. 6 is a fragmentary, rear view in section indicating the flexible drive-tensioning mechanism.

DESCRIPTION OF THE PREFERRED EMBODIMENT

Figure 1:
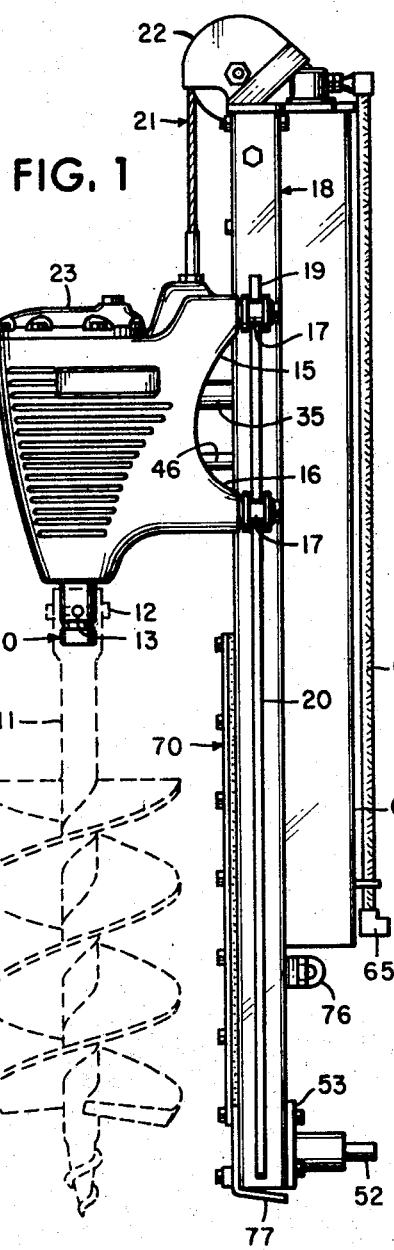
FIG. 1 is a side elevation of the machine illustrating the crosshead assembly, the boring tool being shown in phantom outline.
Figure 3:
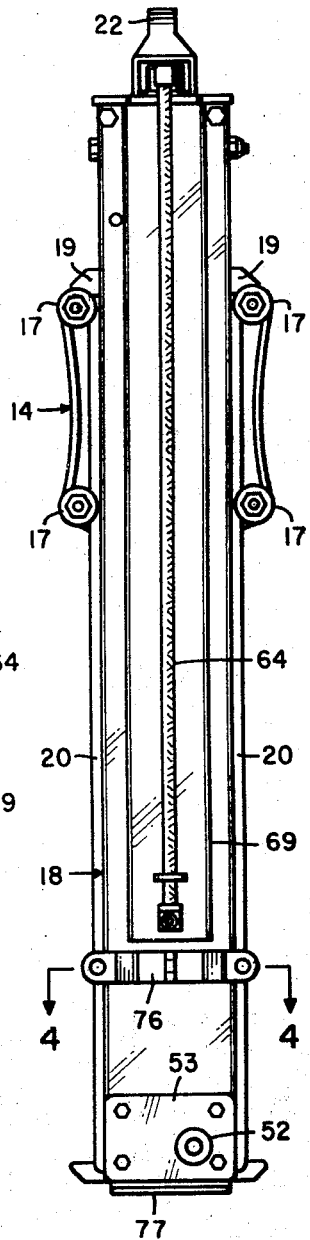
FIG. 3 is a front view of the machine illustrating the track and roller guide mechanism.
Figure 4:
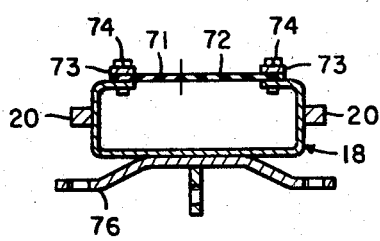
FIG. 4 is an enlarged, sectional view taken on line 4—4 of FIG. 3.

Referring now by characters of reference to the drawings, and first to FIG. 1, it will be understood that the invention includes a main shaft 10 having a spigot and socket attachment to a boring tool 11, a retaining bolt 13 is provided as a safety measure should the shear bolt 12 fail.

The main shaft 10 is vertically mounted within the crosshead housing 14. The crosshead housing 14, by virtue of a pair of upper and a pair of lower laterally extending legs 15 and 16 respectively, provided with rollers 17, is movably mounted on the vertical channel-shaped post 18. An elongate track 20 fixedly attached to each side of the post 18 provides a guide means cooperating with the rollers 17 to insure that the crosshead housing 14 maintains parallel alignment with the vertical post 18.

The stops 19 limit upward travel of the crosshead housing 14 on the post 18.

The crosshead housing 14 is suspended from the vertical post 18 by means of a cable 21 passing over a sheave assembly 22 provided at the upper end of the post 18 above the housing 14.

As shown in detail in FIG. 5, the crosshead housing 14 includes a detachable cap 23 secured by means of fasteners 24. A socket portion 25 of the detachable cap 23 is fitted with a ball race 26 which provides a journal bearing for one end of the main shaft 10, the main shaft 10 being retained within the socket portion 25 by means of retaining nut 27.

The lower end of the crosshead housing 14 is provided with an aperture 30 containing a ball race 31 forming a journal bearing for the lower end of the main shaft 10. The lower end of the main shaft 10 is provided with a shoulder portion 32 which cooperates with the ball race 31, the ball race 31 providing an abutment means supporting the main shaft 10. Upon removal of the cap 23, the main shaft 10 can be lifted clear of the crosshead housing 14.

The main shaft 10 is provided with a bevel gear 33 which cooperates with a coacting bevel gear 34 provided at one end of a transverse drive shaft 35 laterally mounted within the crosshead housing 14 between oppositely facing ball races 36 and 37 set into the sidewalls of the drive shaft chamber 42. Access to the drive shaft chamber 42 is afforded by means of cover plate 43 which is secured to the crosshead housing 14 by fasteners 44.

The externally projecting end of the transverse drive shaft 35 is fitted with a fixed pulley 45.

Two stub axles 46 fixedly attached and projecting from the crosshead housing 14 provides trunnion means rotatably mounting tensioning pulleys 47 in spaced, adjacent relation with the fixed pulley 45 and in substantial vertical alignment with the transverse drive shaft 35. This arrangement is clearly shown in FIG. 6. FIG. 6 also illustrates the flexible drive assembly 50 mounted within the vertical post 18, the post 18 serving as a housing for the flexible drive assembly 50.

The flexible drive assembly 50 includes a driver pulley 51 mounted at the lower end of the post 18 on a stub axle 52 projecting from a trunnion assembly 53. The opposite end of the stub axle 52 constitutes a jack shaft adaptor designed to engage with an external power supply such as that found in the conventional tractor. The adaptor constitutes a power input having a fixed elevation relative to the post 18.

Mounted at the upper part of the post 18 and at the opposite end of the flexible drive assembly 50, a driven pulley 54 is provided. The driven pulley 54 is rotatably mounted at one end of a bell crank 55 rotatably connected at its vertex to a lug 56. A bolt 57, threadedly connected between the flanges of the post 18, is provided with a nut 58, the nut 58 cooperating with the other leg of the bell crank 55 to provide an adjustment means for tightening the flexible drive system 50. A flexible endless belt 49 extends between and operatively interconnects the pulleys 51 and 54. The fixed pulley 45 engages the inside of belt 49, while the tensioning pulleys 47 engage the outside.

A retraction system 60 is mounted in parallel alignment on the outside of the post 18 to provide means for controlling the elevation of the main shaft 10. The retraction system consists of an inverted hydraulic cylinder 61 fixedly attached to post 18 by means of support plates 62 and 63 which hold the upper and lower ends of the inverted cylinder 61 respectively. The cylinder 61 is provided with a lead line 64 having a fitting 65 at its lower end adapted to connect to an outside supply line. A plunger 66 is slidably received within the cylinder 61, the plunger 66 being provided at its outer end with a sheave assembly 67.

The cable 21, attached at one end to the crosshead housing 14, passes over the sheave assembly 22 mounted at the upper end of the post 18. The cable 21 then passes over the sheave assembly 67 provided at the end of the plunger 66, and is connected to the support plate 63, and hence to the post 18 by means of a stop 68. A sheet metal housing 69 is securely attached to the post 18 to provide a cover for the retraction system.

Figure 2:
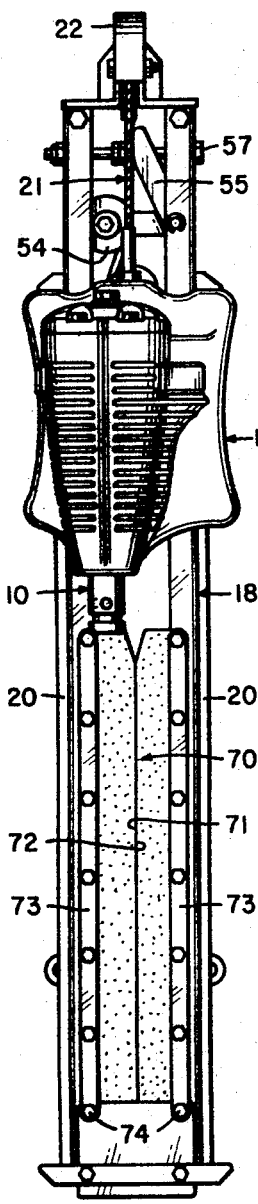
FIG. 2 is a rear view indicating the self-sealing guard assembly protecting the flexible drive.

A guard system 70 (FIG. 2) is provided to protect the interior of the post 18 adjacent to the boring tool 11 to protect the flexible drive assembly from debris discharged by the boring tool 11. The guard system includes oppositely facing flexible elements 71 and 72 attached respectively to each side of the post 18 by retaining bars 73. The bars 73 are connected to the post 18 by means of bolts 74. The flexible elements 71 and 72 form a self-sealing slit which receives the transverse drive shaft 35 and the adjacent stub axles 46 as the crosshead housing 14 travels along the length of the post 18.

A hitching element 76 is provided which together with the seating portion 77 of the post 18 provides a means of attaching the post 18 to a transporting vehicle.

It is thought that the functional advantages of this boring machine has become fully apparent from the foregoing description of parts, but for completeness of disclosure the operation of the digger will be briefly described.

The main shaft 10, having a boring tool 11 attached to its end, is mounted within the crosshead housing 14, the main shaft 10 being rotatably driven by the transverse drive shaft 35. The offset bevel gear drive between the two shafts 10 and 35 necessitates that the housing 14 be laterally offset relative to the post 18 on which the housing 14 is mounted. This mounting offset is clearly shown in FIG. 2. Returning to FIG. 6. the fixed pulley 45 mounted at the end of the transverse drive shaft 35 is driven by one flank of the flexible endless belt 49. Tensioning pulleys 47 above and below the fixed pulley 45 are rotatably mounted on stub axles 46 fixedly attached to the crosshead housing 14. This arrangement permits the crosshead housing 14 to travel on guide tracks 20 along the length of the post 18 while the flexible belt 49 maintains driving contact with the fixed pulley 45.

The boring tool 11 is raised and lowered by means of an elevational control system including the retraction system 60. It will be clear that outward movement of the plunger 66 causes the boring tool 11 to be raised, while inward movement of the plunger 66 allows the boring tool 11 to be lowered, assisted by gravity. The provision of the sheave 67 at the outer end of the plunger 66 results in a lifting arrangement having a mechanical advantage of two.

It will be understood that the flexible drive assembly 50, which is housed in the post 18, includes a driver pulley 51 and a driven pulley 54, and that the belt 49 is tightened by adjustment of the threaded nut 58 against the upper leg of the bell crank 55. The driver pulley 51 is mounted on a stub axle 52 which is rotatably mounted within a trunnion assembly 53 thereby to provide a jack shaft adaptor suitable for receiving power from an external supply.

Although the invention has been described by making detailed reference to a single preferred embodiment, such detail is to be understood in an instructive rather in any restrictive sense, many variations being possible within the scope of the claims hereunto appended.

I claim as my invention:

1. In an auger:
    (a) a boring tool,
    (b) a main shaft,
    (c) means attaching the boring tool to the main shaft,
    (d) a post,
    (e) means operably mounting the main shaft on the post,
    (f) drive means operably connected to and rotating the main shaft, the drive means including a power input, adaptor means having a fixed elevation relative to the post,
(g) elevational control means including a cable operably connected to the mounting means to carry the load therefrom thereby controlling the elevation, including constant elevation, of the main shaft relative to the post during the operable rotation of the main shaft and the boring tool,
(h) the means mounting the main shaft including a crosshead housing,
(i) guide means operably mounting the housing on the post for movement along the post,
(j) the drive means including:
   (1) driver and driven elements mounted in spaced relation along the post and an endless flexible drive element traversing between the driver and driven elements,
   (2) a transverse drive shaft rotatably mounted in and movable with the housing and having means at one end operably interconnected to the endless flexible drive element and means at the other end operably interconnected to the main shaft,
   (3) tensioning means including a pair of trunnions operably engaging the endless flexible drive element to facilitate driving between the endless flexible drive element and the transverse drive shaft, the trunnions being attached to and movable with the housing, and extending outwardly from the housing adjacent to the transverse drive shaft,
   (4) the trunnions being disposed on either side of and in substantial alignment with the transverse drive shaft and in substantial parallel alignment with the driver and driven elements to facilitate load transfer to the cable.

2. In an auger:
(a) a boring tool,
(b) a main shaft,
(c) means attaching the boring tool to the main shaft,
(d) a post,
(e) means operably mounting the main shaft on the post,
(f) drive means operably connected to and rotating the main shaft, the drive means including a power input, adaptor means having a fixed elevation relative to the post,
(g) elevational control means operably connected to the mounting means and thereby controlling the elevation, including constant elevation, of the main shaft relative to the post during the operable rotation of the main shaft and the boring tool,
(h) the mounting means includes a housing in which the main shaft is mounted,
(i) the elevational control means includes a retraction means fixedly attached to the post and operably connected to the housing to allow height adjustment of the housing relative to the post, the retraction means including a cylinder fixedly attached to the post and a plunger slidably received within the cylinder,
(j) flexible means link the retraction means and the housings,
(k) the drive means including:
   (1) driver and driven elements mounted in spaced relation along the post, and an endless flexible drive element traversing between the driver and driven elements,
   (2) a transverse drive shaft rotatably mounted in the housing and having means at one end operably interconnected to the endless flexible element and means at the other end operably interconnected to the main shaft in fixed elevational relation to the tool, and
   (3) tensioning means operably engage the endless flexible drive element to facilitate driving between the endless flexible drive element and the transverse drive shaft.

3. In an auger:
(a) a boring tool,
(b) a main shaft,
(c) means attaching the boring tool to the main shaft,
(d) a post,
(e) means operably mounting the main shaft on the post,
(f) drive means operably connected to and rotating the main shaft, the drive means including a power input, adaptor means having a fixed elevation relative to the post,
(g) elevational control means operably connected to the mounting means and thereby controlling the elevation, including constant elevation, of the main shaft relative to the post during the operable rotation of the main shaft and the boring tool,
(h) the drive means includes:
   (1) driver and driven elements mounted in spaced relation along the post and an endless flexible drive element traversing between the driver and the driven elements,
   (2) a transverse drive means transmitting motive force from the endless flexible drive element to the main shaft, the transverse drive means including means providing tensioning between the endless flexible drive element and the transverse drive means,
(i) the post being hollow to provide an elongate housing for the endless flexible drive element, and
(j) the post including a longitudinal slot to allow the transverse drive means, operably interconnecting the main shaft and the endless flexible drive element, to travel freely between predetermined points along the length of the post,
(k) the lower portion of the longitudinal slot of the post including a cover having a self-sealing slit communicating with the endless flexible drive element housing to receive the transverse drive means during movement, the cover providing a guard protecting the interior of the post housing from waste matter discharged by the boring tool.

4. In an auger:
(a) a boring tool,
(b) a main shaft,
(c) means attaching the boring tool to the main shaft,
(d) a post,
(e) means operably mounting the main shaft on the post,
(f) drive means operably connected to and rotating the main shaft, the drive means including a power input, adaptor means having a fixed elevation relative to the post,
(g) elevational control means operably connected to the mounting means and thereby controlling the elevation, including constant elevation, of the main shaft relative to the post during the operable rotation of the main shaft and the boring tool,
(h) the mounting means including a crosshead housing in which the main shaft is mounted, the housing including a detachable cap plate at one end having journal means laterally supporting the upper end of the main shaft, and the housing having an aperture at the opposite end receiving the main shaft, the margin of the aperture forming a peripheral abutment,
(i) the main shaft including shoulder means at its lower end cooperating with the peripheral abutment to provide a longitudinal stop supporting the main shaft,
(j) guide means operable mounting the housing on the post for movement along the length of the post, the guide means includes a pair of longitudinal tracks on the post, and roller means attached to the crosshead housing interengaged with the tracks,
(k) the drive means including:
  (1) driver and driven elements mounted in spaced relation along the post, and an endless flexible drive element traversing between the driver and driven elements,
  (2) a transverse drive shaft rotatably mounted in and movable with crosshead housing and having means at one end operably interconnected to the endless flexible drive element, and having means at the other end operably interconnected to the main shaft,
  (3) tensioning means operably engaging the flexible drive element to facilitate driving between the endless flexible drive element and the transverse drive shaft, the tensioning means including a pair of trunnions attached to and movable with the crosshead housing, the trunnions extending outwardly from the crosshead housing, each trunnion being adjacently disposed to and in substantial vertical alignment with the transverse drive shaft,
(l) the elevational control means including a retraction means comprising:
  (1) an inverted hydraulic cylinder, substantially parallel with and fixedly attached to the post,
  (2) a plunger received by the cylinder, the plunger having sheave means at its free end,
  (3) a cable having one end in fixed relation to the cylinder and the other end operatively connected to the crosshead housing,
  (4) sheave means attached to the post above the crosshead housing, the cable passing over both sheave means so that outward movement of the plunger raises the crosshead housing,
(m) the post being substantially channel-shaped in configuration to provide an elongate housing for the endless flexible drive element, and
(n) the lower part of the post including a cover having a self-sealing slit communicating with the endless flexible drive element housing to receive the transverse drive shaft during movement between predetermined points along the length of the post, the cover providing a guard protecting the interior of the post housing from waste matter discharged by the boring tool.

References Cited

UNITED STATES PATENTS

| | | | |
|---|---|---|---|
| 1,604,896 | 10/1926 | Foltz | 173—26 X |
| 2,643,858 | 6/1953 | Hardman | 173—147 X |
| 2,088,649 | 8/1937 | Hart | 173—147 X |
| 2,410,959 | 11/1946 | Brown | 173—147 |
| 2,415,572 | 2/1947 | Jaques | 173—40 |
| 2,480,537 | 8/1949 | Arps et al. | 173—26 |
| 2,509,410 | 5/1950 | Applegate | 173—26 |
| 2,533,123 | 12/1950 | Leavengood | 173—26 |
| 2,581,535 | 1/1952 | Jackson | 173—140 X |
| 2,701,124 | 1/1955 | Pronio | 173 —140 X |

FOREIGN PATENTS

| | | |
|---|---|---|
| 157,293 | 6/1954 | Australia. |

DAVID H. BROWN, Primary Examiner

U.S. Cl. X.R.

173—26, 147